INVENTOR
DONALD J. McGEE
BY David A. Mason
ATTORNEY

July 14, 1970  D. J. McGEE  3,520,548

SUSPENSION

Filed March 18, 1968  2 Sheets-Sheet 2

INVENTOR
DONALD J. McGEE

BY David A. Maxon
ATTORNEY

United States Patent Office 3,520,548
Patented July 14, 1970

3,520,548
SUSPENSION
Donald J. McGee, 3871 Woodman Drive,
Troy, Mich. 48084
Filed Mar. 18, 1968, Ser. No. 713,761
Int. Cl. B60g 11/46, 5/00
U.S. Cl. 280—104.5
9 Claims

ABSTRACT OF THE DISCLOSURE

This invention relates to a suspension for tandem axles of a truck. A trunnion tube is fixed to the frame of the truck. A multi-leaf spring is fixed near its center to a bearing journaled on the trunnion tube. The spring is journaled at its end to pins fixed on a beam. Twin axles of the truck are attached to the ends of the beam. A pair of air bags is provided between the frame of the truck and the beam, being at a distance from the trunnion tube. A pair of ledges is provided underneath the spring near each of its ends for discrete seating of the ends of the spring, at two different positions. By monitoring the air pressure in the air bags, the parameters of suspension can be selectively varied either discretely or continuously over a broad range of values corresponding to different loads on the truck.

---

This invention relates generally to suspensions for motor vehicles. More particularly, this invention relates to suspensions for tandem axles of a truck or trailer having air bags and a multiple leaf spring providing selectively continuous or discrete variation of spring rate, vibration fundamental, and load capacity.

In the art of truck suspension, it has been a common practice to provide either a fixed, or a discrete variation, or a continuous variation of the spring rate or vibration fundamental or load capacity of a truck suspension. However, until the present invention, no suspension *selectively* provides for discrete and continuous variation of spring rate, vibration fundamental, and load capacity. The lack of this ability to selectively provide for discrete or continuous variation of these perameters has reduced the ability of past suspensions to provide for an optimum combination of these perameters. For example, where a suspension provides only for continuous variation of these perameters, a change in the value of one of these perameters will necessarily cause a change in the value of another of these perameters that may not be desired. Thus, where only a continuous variation of these perameters is provided, at tare weight, a low spring rate can be provided but the vibration fundamental of the suspension may be inappropriate.

If a suspension provides only for discrete selection of these perameters, an optimum combination of these perameters can be provided at tare weight or full load, but these values may be inappropriate at load conditions that are greater than tare weight and less than full load.

It is an object of this invention to provide a suspension for driven tandem wheels on a truck or tractor that can selectively provide for several perameters of suspension characteristics to vary discretely or continuously over a range of different loads.

It is another objection of this invention to provide a suspension that provides an optimum combination of spring rate, vibration fundamental, and load capacity over a range of different loads.

It is another object of this invention to provide a suspension for driven tandem axles of a truck or tractor that can selectively provide for an optimum combination of suspension characteristics over a range of different loads and that is uncomplicated in design and economical to manufacture and maintain.

It is a further object of this invention to provide for a suspension for driven tandem axles of a truck or tractor that can selectively provide for continuous or discrete variations of several suspension characteristics over a range of different loads and that is durable and strong and yet light in weight.

Other objects of this invention will appear in the following description and appended claims, referring to the accompanying drawings forming a part of this specification.

In its preferred embodiment, this invention comprises a bracket member fixed to the frame of a truck or tractor. A cylindrical member is journaled on this bracket member. A multiple leaf spring is fixed near its center to the cylindrical member. A pair of air bags are fixed at one end, and at the other end to an extremity of the multiple leaf spring. A beam member having journaling couplings at its end is fixed to the extremities of the multiple leaf spring. A shim providing two seats, one near the end of the extremity of the multiple leaf spring and the other at a point closest to the center of the multiple leaf spring is provided between the multiple leaf spring and the beam. The air bags can be selectively insulated or deflated from a pnuematic source controlled from the cab of the truck or tractor.

Figure 3:
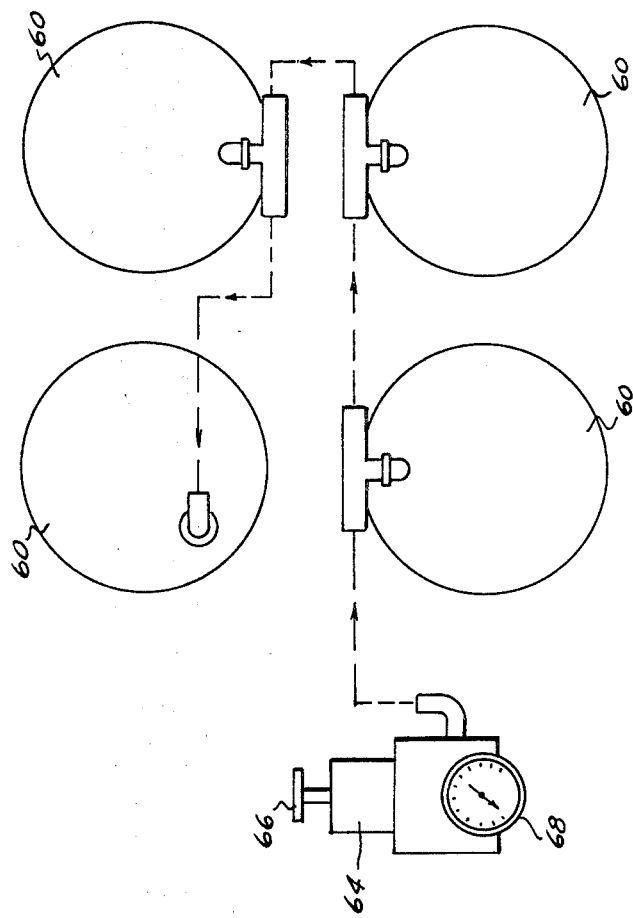

At FIG. 3 is a diagram of the pneumatic system used in the preferred embodiment of this invention.

Before explaining the present invention in detail, it is to be understood that the invention is not limited in its application to the details in construction and arrangement of parts illustrated in the accompanying drawings since the invention is capable of other embodiments and of being practiced or carried out in various ways.

Also it is to be understood that the phraseology and terminology employed herein is for the purpose of description and not of limitation.

Figure 1:
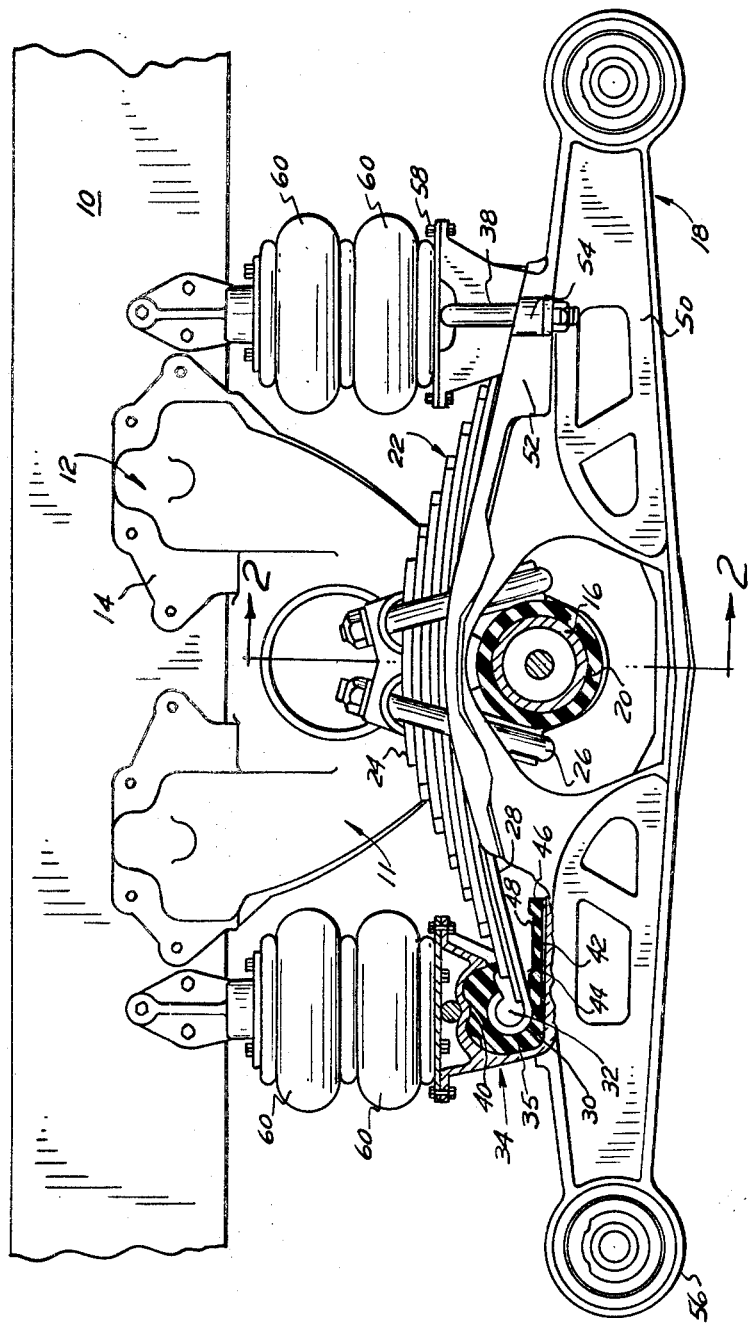
FIG. 1 is a side view of the preferred embodiment of this invention.
Figure 2:
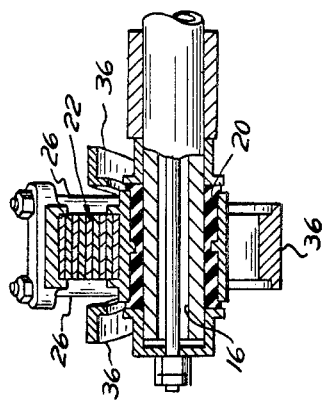
FIG. 2 is a partial cross sectional of the apparatus shown in FIG. 1 taken along the section lines 2—2.

As shown on the drawing:

In FIG. 1 there is shown a preferred embodiment of this invention. Portions of this embodiment are disclosed in U.S. Pat. No. 3,083,980 issued in 1963 to Ancel S. Page and assigned to the Dura Corporation of Oak Park, Michigan, a corporation of Michigan, and also assignee of the instant patent application.

The suspension, shown generally at Numeral 11, is mounted on a frame 10 of a vehicle by means of bracket members 12 having flanges 14 rigidly secured thereto. The brackets 12 have a cylindrical member 16 secured thereto and extending in an axially aligned direction across the bottom of the frame 10.

A suspension structure 18 has a cylindrical portion 20 that is coaxial with the cylindrical member 16 and is journaled thereon. The cylindrical portion 20 may be a bearing or bushing.

A multiple leaf spring 22 extends lengthwise transversely along the side of the vehicle frame 10. It is rigidly secured near its central portion 24 to the cylindrical portion 20 by means of U-bolts 26. The lowest leaf 28 of the multiple spring 22 is curled near its end 30 around a pin 32. This pin 32 is cylindrically shaped and extends in a direction axially parallel with the cylindrical member 16 and cylindrical portion 20. The end 30 of the leaf 28 cooperates with the pin 32 to provide a journaling coupling between the multiple leaf spring and securing means 34. The fore and aft translations of the multiple leaf spring 22 with respect to the securing means 34 is yieldably cushioned by means of a rubber seat 35. This rubber seat is contained within a well or chamber formed in the interior surfaces of the securing means 34. A beam member 36 extends lengthwise transversely with the frame 10. Midway between its center and ends, it is rigidly secured to the securing means 34.

The beam 36 is secured to the securing means 34 by means of U-bolts 38. In its preferred embodiment, the securing means 34 has the aforementioned interior chamber for containing the rubber cushion 35 and being rigidly secured to the pin 32. Also, a ridge 40 is provided within the interior of the securing means 34, and to which rubber cushion 35 is fitted with a corresponding valley, so that the rubber cushion 35 fits snugly within this chamber and provides a secure seating for the spring 22.

Integral with the rubber cushion 35 is a rubber flange 42 that extends towards the cylindrical member 16. This flange 42 rests underneath the lowest leaf 28 of the spring 22. It has ledges 44 and 46 separated by a depression 48. When the extremities 30 of the spring 22 are in a relatively low position, the bottom of a spring extremity 30 rests against the foremost ledge 44. When the extremity 30 is in a relatively more upward position, the bottom leaf 28 rests against the abaft ledge 46. In this two discreteful manner, lengths of the spring 22 is provided, each having a different characteristic spring rate, load capacity and fundamental frequency of vibration.

The beam member 36 comprises lower structural load carrying beam portion 50 and an upper central beam portion 52. It is at the fore and aft extremities of the upper main portion 52 that the main lever 36 is secured by the securing means 34. Suitable nuts seats 54 are provided in the structure of the upper beam portion 52, to facilitate the security of the U-bolts 38. The fore and aft extremities 56 of the lower beam portion 50 are cylindrical in shape and contain a bushing for securing links to tandem axles of the vehicle. In an alternative embodiment, the tandem axles are journaled to the end portions 56 of the lower beam portion 50.

The foregoing description comprises structure already disclosed in the Page patent. In the preferred embodiment of the present invention, additional suspension is provided and cooperates with the aforementioned structure. The securing means 34 are rigidly secured to platforms 58. Bottoms of a pair of air bags 60 are rigidly secured to platforms 58. These air bags are preferably neoprene or nylon cord bags adapted for industrial or truck suspension use. While their bottoms are secured to the platform 58, their tops are secured to brackets 62. These brackets 62 are in turn rigidly secured directly to the frame 10 of the vehicle.

Referring to FIG. 3, there is shown a preferred embodiment of means for selectively energizing the air bags 60 to desired pressures. These pressures correspond to preselected values for determining best ride characteristics, load carrying ability, spring oscullation and spring rate of the suspension. A pneumatic source 64 is equipped with a valve 66 and pressure gauge 68 for manually controlling the air pressure in the bags from the cab of the vehicle.

The air bags are provided with rubber bumpers (not shown) secured to their tops and bottoms, extending downwardly and upwardly, respectively, towards each other within the air bags. These bumpers limit the upward translation of the beam with respect to the frame by meeting each other.

One of the characteristics of the preferred embodiment of this invention is the fact that four points of suspension, each independent of each other, is provided for securing the suspension to the truck frame. A pair of separate brackets are provided for each of the air bags and a pair of separate brackets are provided for the bracket member 12. In this manner, undue concentration of stress on the frame 10 of the vehicle is avoided.

Another characteristic of the preferred embodiment of this invention is its ability to preselectively provide different ranges and different qualities of load carrying ability, spring rate, fundamental of frequency of oscullation of spring members of the suspension and a resiliency to reversing of load imperfections. For example, when the bags are inflated to relatively low internal air pressure, and the vehicle is loaded sufficiently, spring rate, spring fundamental, and structural load carrying ability are limited to two discrete values by the multiple leaf spring resting on the ledges 44 and 46.

Alternatively, when the vehicle is fully loaded, and the air bags are inflated to a relatively high pressure, a considerable portion of the load is being carried by the air bags. In this manner, a continuous variation of load carrying capacity, spring rate, fundamental of frequency of oscullation of the spring, and resiliency of the suspension to traversing of road irregularities can be provided by varying continuously or on a continuous range the pressure in the air bags.

In a further alternative operation of the preferred embodiment of this invention, at moderate air pressure within the air bags, a combination of discrete and continuous variation of spring parameters is provided.

In an alternative embodiment of this invention, a tapered leaf spring can be substituted for the multiple leaf spring.

It can be appreciated from the foregoing description of the preferred embodiment of this invention, that optimal suspension characteristics can be selected for different loadings of the vehicle varying from a virtual bob-tail or tare weight condition to a fully loaded condition and various loads in between those two extremes, by simply varying the air pressure in the air bags.

Another feature of this invention is that in its preferred embodiment, it can be applied to previously installed suspensions previously used at low cost and with uncomplicated apparatus.

I claim:

1. In a motor vehicle suspension, the improvement comprising:
 a cylindrical member secured to the frame of the vehicle;
 a member having an interior cylindrical surface journaled on said cylindrical member;
 a leaf spring rigidly secured to said journaled member;
 a beam member carrying axles near its ends secured to the ends of said leaf spring;
 means interposed between said beam member and the ends of said spring providing a plurality of discrete seating arrangements of said spring on said beam member;
 a pair of air bags interposed between said beam member and said frame;
 and means for selectively energizing said air bags to carry a predetermined portion of the structural load of said vehicle on the suspension;
 whereby structural load carrying ability, spring rate of deflection, fundamental frequency of oscillation, and dampening of components of said suspension can be selectively varied discretely and continuously over predetermined ranges of values.

2. The apparatus of claim 1 wherein said leaf spring comprises a plurality of elliptical leafs.

3. The apparatus of claim 1 wherein said seating means is resilient.

4. The apparatus of claim 1 wherein said seating means has two ledges separated by a depressed plateau whereby said spring rests on a first one of said ledges at tareweight and rests on the other of said ledges when the structural load on the suspension reaches a predetermined level and the air bags are energized to a predetermined pressure.

5. The apparatus of claim 1 wherein said beam member extends in a transverse longitudinal direction with respect to said frame;

pin members rigidly secured to said beam member;

and said leaf spring member being journaled on said pin members.

6. The apparatus of claim 1 and resilient means limiting the motion of an end of said spring with respect to said beam vertically and horizontally.

7. The apparatus of claim 1 wherein said air bags have rubber bumpers contained therein limiting the extent of vertical collapse of said air bags.

8. The apparatus of claim 1 and a rubber bushing interposed between said interior cylindrical surfaced journaled member and said cylindrical member.

9. The apparatus of claim 1 wherein said means for selectively energizing said air bags comprises a valve controlled in the cab of the motor vehicle and a pressure gauge that can be observed in said cab.

References Cited

UNITED STATES PATENTS 3,083,980  4/1963  Page.
2,998,261  8/1961  Bartlett _____ 280—124 X PHILIP GOODMAN, Primary Examiner U.S. Cl. X.R.

267—18; 280—124